United States Patent [19]
Pierce et al.

[11] Patent Number: 5,493,277
[45] Date of Patent: Feb. 20, 1996

[54] DEVICE FOR MONITORING THE WATER LEVEL OF A CONTAINER AND FOR ADDING WATER TO THE CONTAINER

[76] Inventors: Lindy Pierce, 296 Summit Dr., Campbellsville, Ky. 42718; Nancy L. Snow, Northwood Village, Box A2, Plainfield, Vt. 05667

[21] Appl. No.: 442,639

[22] Filed: May 17, 1995

Related U.S. Application Data

[63] Continuation of Ser. No. 117,839, Sep. 8, 1993, abandoned.

[51] Int. Cl.⁶ .................................................. G08B 21/00
[52] U.S. Cl. ............................ 340/620; 340/618; 47/79; 47/40.5

[56] References Cited

U.S. PATENT DOCUMENTS

| | | | |
|---|---|---|---|
| 3,498,131 | 3/1970 | Rickey | 73/304 R |
| 3,781,840 | 12/1973 | Roberts et al. | 340/245 |
| 4,653,224 | 3/1987 | Weckesser | 47/40.5 |
| 4,796,017 | 1/1989 | Merenda | 340/620 |
| 4,825,587 | 5/1989 | Stancil | 47/40.5 |
| 4,850,137 | 7/1989 | Foster | 47/79 |
| 4,903,530 | 2/1990 | Hull | 340/620 |
| 4,930,252 | 6/1990 | Krause et al. | 47/40.5 |
| 4,985,699 | 1/1991 | Evans | 340/825.240 |
| 4,993,176 | 2/1991 | Spinosa | 40/40.5 |
| 5,009,028 | 4/1991 | Lorenzana et al. | 47/40.5 |
| 5,054,236 | 10/1991 | Sands | 47/79 |
| 5,058,421 | 10/1991 | Alexander et al. | 73/49.2 |
| 5,065,139 | 11/1991 | Shefsky | 340/620 |
| 5,076,009 | 12/1991 | Cibor | 47/40.5 |
| 5,410,839 | 5/1995 | Granger | 47/405 |

OTHER PUBLICATIONS

Photograph and accompanying form of letter dated 4 Oct. 1991 authored by Lindy Pierce.

*Primary Examiner*—Brent A. Swarthout
*Assistant Examiner*—Ashok Mannava
*Attorney, Agent, or Firm*—Foley & Lardner

[57] ABSTRACT

A Christmas tree ornament uses a water sensor that provides on demand an indication by light and/or sound if the tree needs water. A portion of the ornament contains a funnel side which allows water to be added to the tree. The other portion of the ornament contains the circuitry for the sensor. A sensor, in the form of a pair of electrodes or terminals, connected to the circuitry, is contained in the water of the Christmas tree stand. The circuitry further includes a battery, an on/off switch, a resistor, a green LED, and a red LED mounted on a display panel. In operation, when the switch is turned on, the green light is energized indicating that the battery is good (a safety feature). If the red light is not on, it is an indication the tree needs water. Water can be added through a funnel side of the ornament. When the electrodes are immersed in the water, a circuit is completed and the red light turns on to indicate sufficient water for the tree.

18 Claims, 5 Drawing Sheets

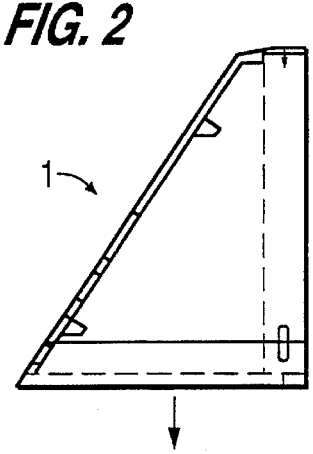
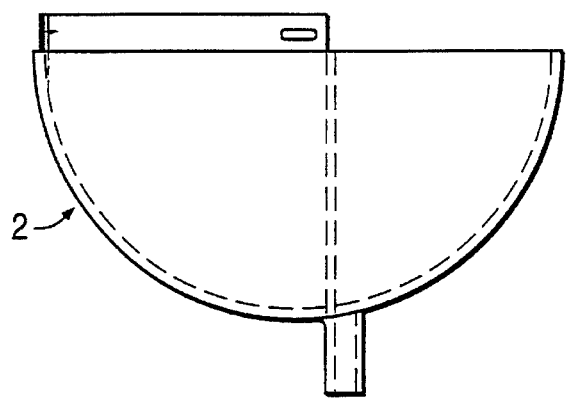
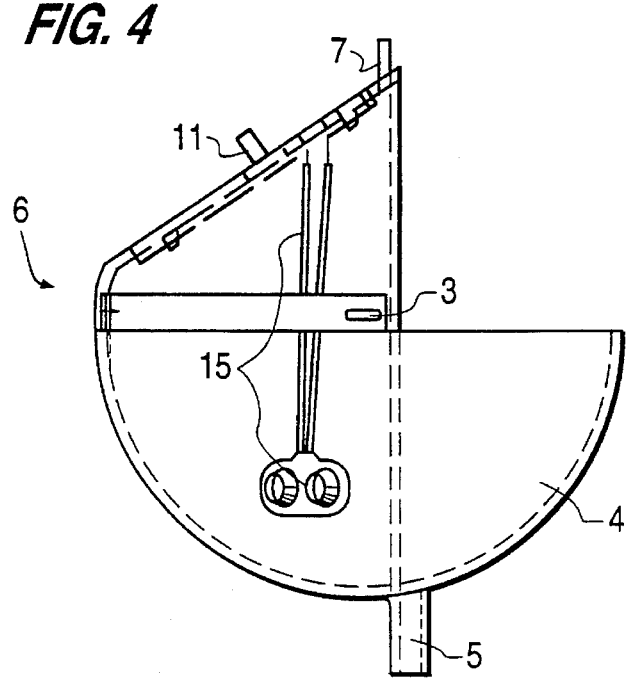

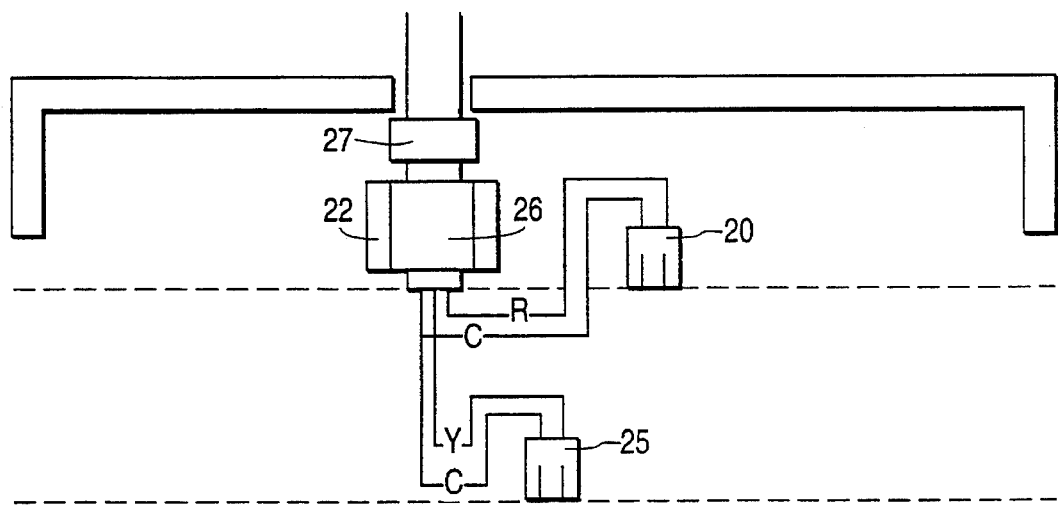
FIG. 12
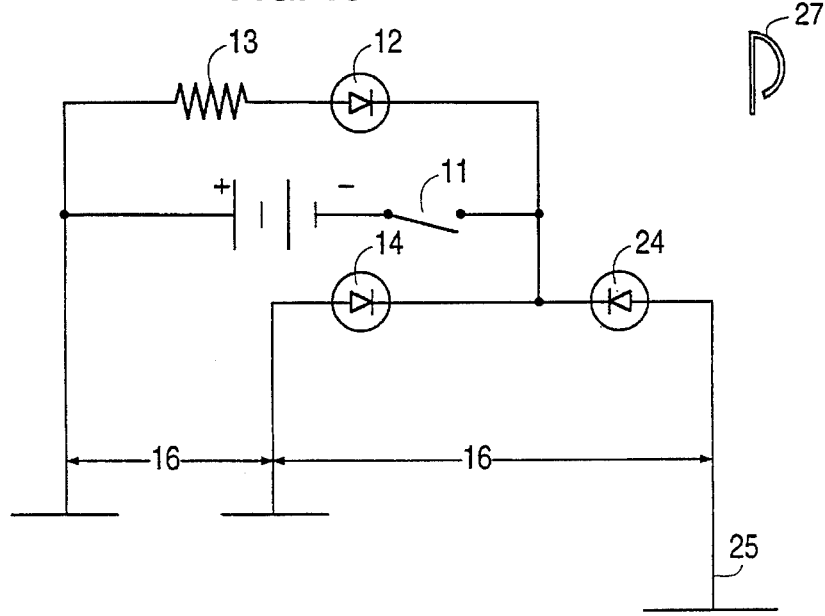
FIG. 13
FIG. 14
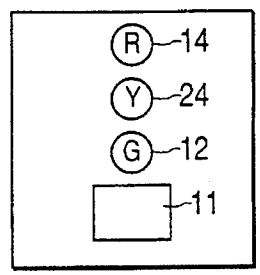
FIG. 15

DEVICE FOR MONITORING THE WATER LEVEL OF A CONTAINER AND FOR ADDING WATER TO THE CONTAINER

This application is a Continuation application Ser. No. 08/117,839 now abandoned, filed Sep. 8, 1993.

BACKGROUND OF THE INVENTION

1. Field of the Invention

This invention relates to devices for checking or monitoring the level of water in a container, such as a Christmas tree stand, and for adding water to the container.

2. Description of the Related Art

As disclosed in U.S. Pat. No. 4,796,017, it is important to keep the water level in a Christmas tree stand above a given level so that the base of the Christmas tree is not exposed to air. When the base is exposed to air, the pores of the base of the tree tend to close and will not absorb further moisture. This results in the cut Christmas tree prematurely drying out. The '017 patent discloses a device for detecting a low water level in the Christmas tree stand and for providing an alarm in the form of a lighted Christmas tree ornament.

There are known devices for watering Christmas trees. Such devices are disclosed in U.S. Pat. Nos. 5,054,236; 5,076,009; 4,993,176; 4,930,252; 4,850,137 and 4,825,587, among others.

Nevertheless, a need exists for a device used both to check on the water level of a tree and to water the tree, without having to get down on the floor or move presents out of the way.

SUMMARY OF THE INVENTION

Accordingly, it is an object of the invention to provide a device that allows a person to monitor the water level of a cut tree to determine whether additional water is needed, and that allows a person to add water to the tree.

Another object is to provide such a device that provides an indication of an intermediate water level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

In accordance with the present invention, an apparatus for monitoring the level of water in a container and for adding water to the container comprises a housing including a funnel; an elongate tube having one end terminating at the funnel for receiving water from the funnel and an opposite end for discharging water into the container; and a circuit including a sensor and a display panel. The display panel is mounted on the housing and has a first indicator for indicating that a power supply is operational and a second indicator for indicating whether a water level in the container has achieved a predetermined level.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIG. 2 is a side view of the top of the ornament.

FIG. 3 is a side view of the bottom of the ornament.

FIG. 4 is a side view of the whole ornament.

FIG. 12 shows a side view of the bottom of the ornament with an alternate embodiment incorporating upper and lower water level sensors.

FIG. 13 is a schematic view of an alternate embodiment, not including the terminals.

FIG. 14 is a top view of a "D" clip for holding the water delivery tube in place.

FIG. 15 is a schematic view of an alternate embodiment of a PC board panel.

DETAILED DESCRIPTION OF THE PREFERRED EMBODIMENTS

Figure 1:
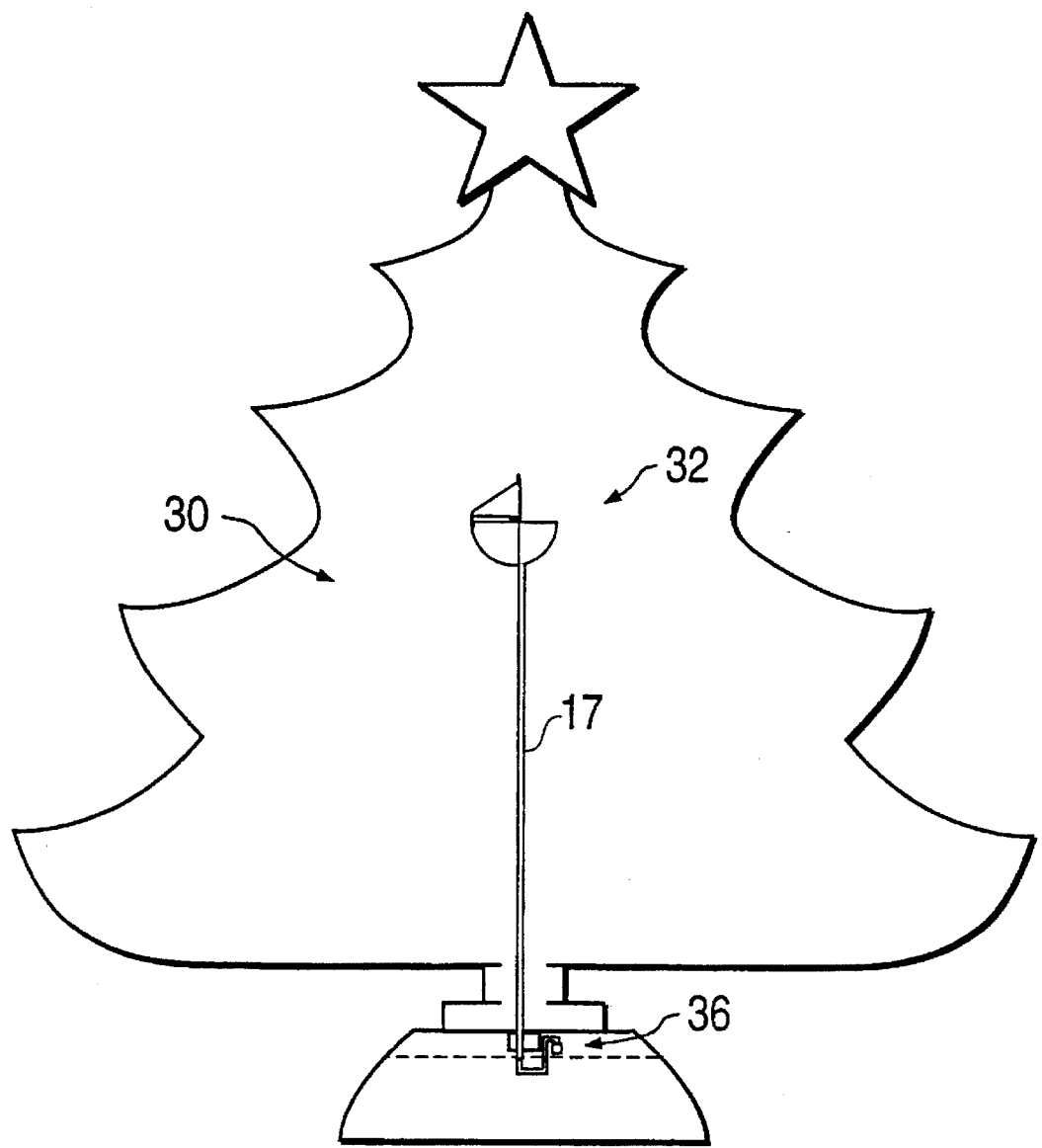
FIG. 1 shows the waterer of the present invention, including the ornament, tube, and sensors, mounted on a Christmas tree and tree stand.

The Water Watcher & Waterer constituting this invention is a sturdy, economical, reliable, and simple device for checking or monitoring the water level and/or adding water to any container or area that needs water. In one preferred embodiment, as illustrated in FIG. 1, its primary use (employing an ornamental form of casing) is to care for the water needs of a tree, such as a Christmas tree. Waterer 30 includes ornament 32, tubing 17, and sensor 36.

The basic construction of ornament 32 includes two major portions or sections. As shown in FIGS. 2 and 3, ornament 32 has a top portion 1 that snaps down into bottom portion 2. When constructed with top portion 1 mounted onto bottom portion 2, as illustrated in FIG. 4, ornament 32 has a back side that includes a funnel 4 and a funnel spout 5, for the purposes of receiving and delivering water. The front side 6 of ornament 32 houses the electronic components and battery (not illustrated, which would ordinarily be a 9 volt battery) keeping the circuits from exposure to water. In one preferred embodiment, the casing of ornament 32 is molded from high impact polystyrene with 0.050" thick walls.

Figure 7:
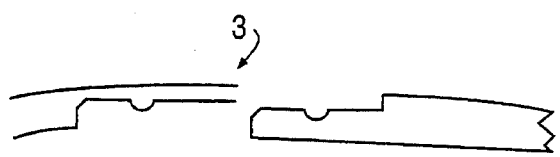
FIG. 7 is a detailed view of the snap closures.

Several alternative methods of connecting the front and back parts are considered possible, including various types of hinges, sonic welding, and gluing. Because none of them are deemed reliable enough in terms of durability or being waterproof, however, it is preferred to separate the top from the bottom instead, with the front side of the bottom portion being higher than the back side. Because water cannot go above the level of the back side (without first spilling out the back, like a cup overflowing) the front side (electronic side) of the ornament would be protected from water when in normal use. For the same reliability reasons, snap closures 3, as shown in FIGS. 4, 5, and 7, joining the top and bottom sections are preferable to hinges that may be twisted or broken off more easily.

Figure 8:
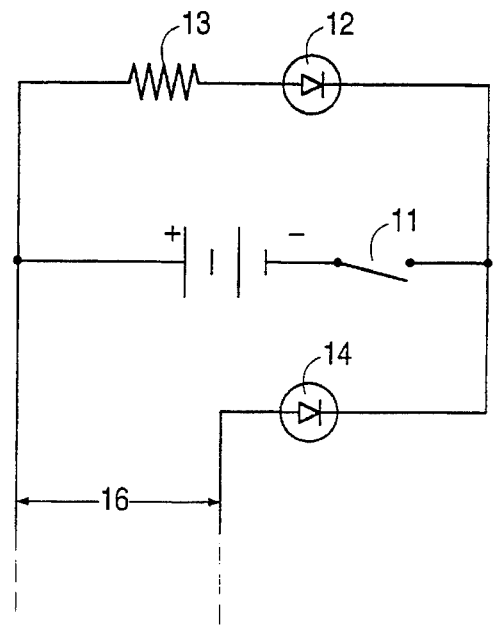
FIG. 8 is a schematic drawing of the circuitry, not including the terminals.
Figure 9:
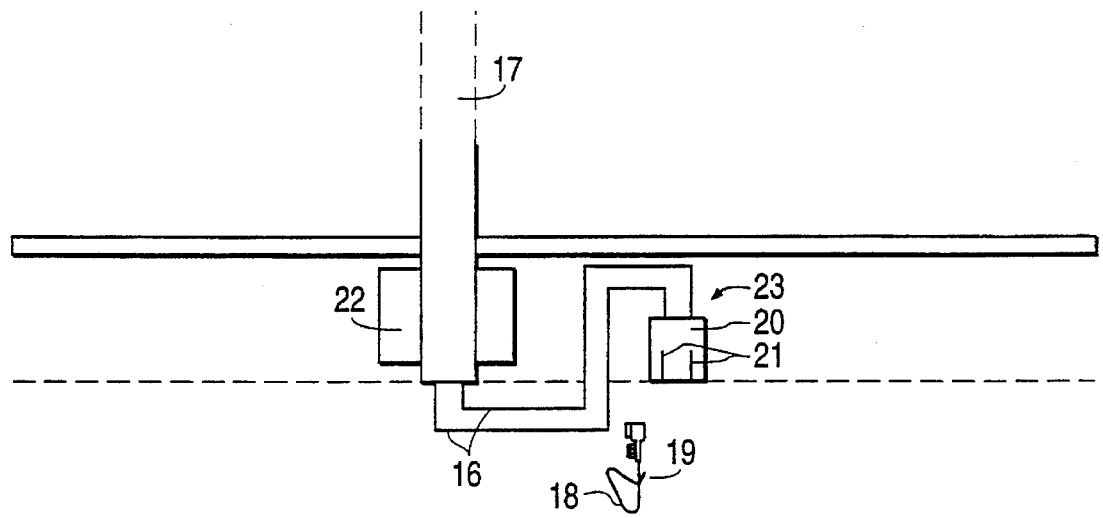
FIG. 9 shows the placement of the tube and connector housing within a tree stand.
Figure 11:
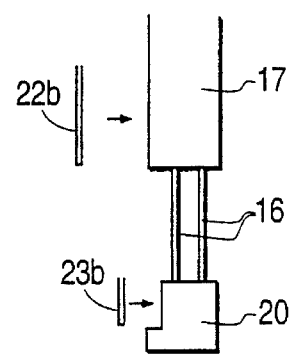
FIG. 11 shows where the companion half of the hook-and-loop is to be applied to the tube and connector housing.

The inside diameter of funnel spout 5 (about 5/32 inches in one preferred embodiment) is sufficient to let water flow at a safe pace while also allowing room for insulated wires 16, as shown in FIGS. 8, 9, and 11. A smaller diameter could cause a backup of water. A larger diameter would require a larger tube 17 which could contain sufficient water to overflow the tree stand if the "stop" signal were not reacted to quickly enough. The outside diameter of tube 17 is about 0.25 inches in one preferred embodiment. A larger tube would also be more visible on the tree, which is not desirable for aesthetic reasons. As shown in FIG. 3, casing bottom 2 has a height of about 2.5 inches in one preferred embodiment.

The open funnel shape is preferable to smaller openings for adding water. Not all homes have a watering can with a long, narrow spout for watering. Some users may be using soda bottles or milk cartons to transport the large amount of water trees require. A smaller opening would not easily accommodate pouring from such containers. If funnel 4 were much larger, the size of the whole ornament would start to become unwieldy for some users.

Figure 5:
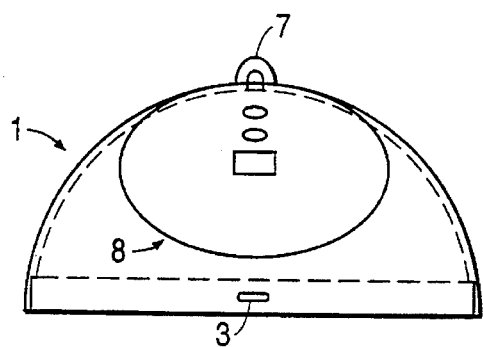
FIG. 5 is a front view of the top of the ornament.

As shown in FIG. 5, ornament 32 has at its top a loop 7 that will accommodate a common wire ornament hook. Rather than creating a hook on ornament 32 itself, the loop and hook combination gives the ornament flexibility when hanging on the tree so that maneuvering it in use is easier.

Figure 6:
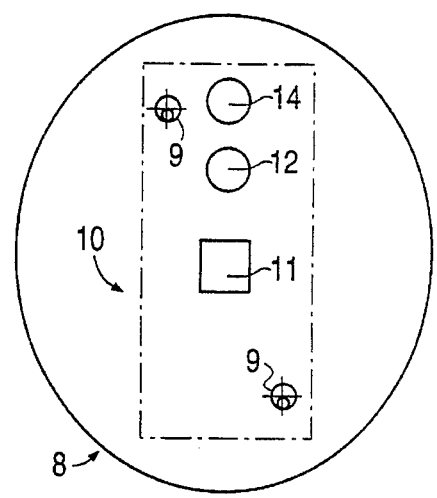
FIG. 6 is a detailed front view of the PC board panel.

As shown in FIGS. 5 and 6, the flat portion of the top/front of ornament 32 is panel 8 for the printed circuit board (PC board) 10 which is mounted by heat stakes 9 for security. Heat-staking is considered a reliable and fairly permanent method of adhesion. Because users will have to open the unit to connect the battery, PC board 10 stands less chance of having its connections inadvertently broken than do wire and solder connections, making it more reliable. It is also much more economical to manufacture.

On/off switch 11 is a "momentary on-release off" type of button. Because a continuous flow of electricity would oxidize the positive wire within hours if left in water, a button that shuts the unit off automatically as soon as it is released is preferred over a SPST switch, because some users may forget to turn the unit off. To have the wire oxidize would mean that the circuit between the two wires in water would be broken. The red Light Emitting Diode (LED) 14, that indicates the optimum water level has been reached, would not light; therefore the user would not know when to stop pouring water, thinking the desired water level had not been reached when in reality it could be well above the desired level.

Although the invention could be practiced with light bulbs, LED's are preferred because they are longer lasting and more economical than many types of filament or non-filament gas-filled bulbs. The green standard T-1 ¾ green LED 12 is a safety feature. On waterer 30, green means "go" and red means "stop", just like a traffic light. This method of signaling is easily used because it is already known to most of the public. A lit green LED means that the battery is not dead. When depressing the button of switch 11, green LED 12 should come on immediately. If not, the user should assume something is wrong with the unit or battery, and not add water until the problem is explored and solved. Without green LED 12 (or other audio/visual signal), an unlit red LED 14 could mean a dead battery OR a need for water. If the battery were dead and the user had no other means to verify this, as with green LED 12, a user might begin adding great amounts of water while waiting for red LED 14 to light, but it never will without a source of power.

The red high-luminosity T-1 ¾ LED 14 ensures easy visibility even in bright daylight. Standard T-1 ¾ LED's are not bright enough when the circuit is being completed by water, even with a 9 volt battery, because of the resistance of the water.

Instead of the standard T-1 ¾ LED, a flashing LED may be used, or a bi-color LED such as red and green, may be used. Other alternate embodiments include using an audio alarm alone or in conjunction with either the green and/or red LED. Use of an audio alarm/tone/musical chip makes it unnecessary to watch for the red LED to light, although the LED is positioned to be seen easily while adding water. However, use of an audio signaling device is not only more expensive but useless to the deaf or hearing impaired if employed without a visual signal within the same circuit.

Another alternative embodiment includes translucent casing 1,2 with a source of illumination such as a light bulb or an LED mounted inside the casing so that the ornament itself will appear to light up when the proper water level is reached. This embodiment could also include the green "go" light mounted, for example, on panel 8.

Yet another alternative embodiment includes using more sensors with their own signals that would measure other water levels. For example, as shown in FIG. 15, using the familiar traffic light mode of electronic signals, a yellow LED 24 could be positioned between the red and green LED's 14 and 12, respectively. Yellow LED 24 should have a high luminosity, i.e., greater than about 100 MCDs (millicandelas), and preferably at least about 200 MCDs. Conveniently, red LED 14 and yellow LED 24 have substantially the same luminosity, though in use the yellow LED would appear to dim as the water reached the desired level and the red LED began to come on. Preferably, this embodiment is part of a circuit that includes a sensor or sensors 25 placed at a water level or levels that are low, but still acceptable. Examples of this embodiment are illustrated in FIGS. 12 and 13. This extra sensor circuit would eliminate the possibility of users going to the trouble of filling a gallon jug of water then pouring only a cup or less into the funnel before the "stop" signal comes on.

FIG. 8 is a schematic circuit diagram of one embodiment of the invention. The circuit includes 10 KΩ, ¼ watt, carbon resistor 13. The direct circuit including green LED 12 and the 9 volt battery would cause green LED 12 to be destroyed if no resistance was provided. It also reduces the luminosity of green LED 12 in order to allow red LED 14 to appear that much brighter by comparison.

A 9 volt cell gives waterer 30 enough potential to function well. Less potential does not light red LED 14 sufficiently because of the water's resistance level within the circuit. It is also easier to install in the ornamental type of unit. Holders for larger numbers of lower voltage cells (AA, AAA, etc.) possessing a total equivalent voltage would necessitate enlarging the whole unit considerably or reducing the size of the funnel to make room, neither of which is preferable. Likewise, a standard-sized higher voltage cell would be too large. Smaller specialty cells providing the same total voltage would be more expensive to the consumer and often more difficult to locate in stores.

The lead and snap connector 15 allows the battery to rest within the bottom part of the front of the ornament. When attaching or removing a battery from snap connector 15, there can be much stress on the snaps. It is preferable to have those snaps on leads rather than soldered into PC board 10 so that stress is not transferred to the board itself, putting the circuitry in danger of being broken.

In one mode of manufacturing, the wire 16 that completes the circuit in water is soldered in a continuous loop to PC board 10 at an electronics factory. At a plastics factory, PC board 10 is heat-staked into the top of ornament 32 and then the wire loop is fed through a small hole into the back of ornament 32, then down through spout 5 of funnel 4. The AWG 26 stranded (for superior conductivity) wire 16, is of a small size that will not take up too much room within the tubing 17, which would reduce water flow, and is also the smallest size allowable for an extra sturdy crimp to the terminals 18. Wire 16 is insulated so that water will not complete the circuit anywhere within tubing 17 as water flows through. Rather, water will complete the circuit only at terminals 18.

Once the loop of wire 16 is threaded through spout 5 of funnel 4, it is pulled through tube 17 where it is cut in the middle, both ends stripped, and crimped to crimp terminals 18.

If smaller terminals—and therefore smaller connector housings 20—are used, housing 20 would be difficult to mount securely to the tree stand with a hook-and-loop fastening device such as a Velcro® fastener. A larger housing supports a greater surface area for attaching a Velcro® fastener, which keeps the terminals and tube from being removed from the stand accidentally.

As shown in FIG. 9, sensor 36 includes terminals 18 mounted in housing or sensor block 20. Crimp terminals 18 are gold plated so that they will not corrode in water, thus making circuit completion weak or nonexistent. Terminals 18 snap into a two-connector nylon (non-conductive) housing 20 designed for electronic connections. Tabs 19 on terminals 18 pop up and out of housing locking ramp 21 when inserted properly into housing 20. These tabs lock the pins into the housing. To remove terminals 18, one must depress tabs 19 firmly with a small narrow instrument, such as a tiny screwdriver, and pull wires 16 at the same time. It is imperative that wires 16 be extremely difficult to pull out so that the connection is not broken. Crimp terminals 18 used with connector housing 20 provide that security. This mode of terminating keeps wires 16 close together for easier circuit completion. Unlike bare or solder-dipped wire, they cannot be bent further apart, be put in direct contact, or corrode, all of which could cause a false reading.

Vinyl tubing 17, preferably with 0.030" walls, is both strong and flexible for easy storage and maneuvering in use. It does not stay kinked, so it will not impair water flow. It can be wrapped around ornament 32 to provide cushioning in transport and storage. Once wire 16 is threaded through tubing 17 (neater and therefore more aesthetically pleasing plus safer for the wire itself than wrapping it around the tube), then tubing 17 can be attached to funnel spout 5 by inserting spout 5 into it at least ½". For a tight fit, the inside diameter of tube 17, e.g. ¼", is just wider than the outside diameter of funnel spout 5.

Tubing 17 and connector housing 20 need to be secured individually for two reasons. First, if just the housing or tube was attached with a Velcro® fastener, that would place housing 20 directly under tube 17. As water flows through tube 17 and down into the tree stand, it would also flow directly into housing 20 and could cause a false high water level "stop" signal to appear. Second, if just connector housing 20 was secured, there would be more chance that a strong yank on ornament 32 or tubing 17 would result in disconnecting wire 16 from the pins, which would cause the red LED circuit to be broken. Therefore, there are two types of a Velcro® fastener used to attach the tubing and connector housing to the inside of the tree stand. Tubing 17, because it will receive the most stress, is secured with a 1"×1" square of molded plastic 200 cycle a Velcro® fastener 22, the same type used in assembly in the automotive industry. Alternatively, a cylindrical tube of a Velcro® fastener 26 could be used. Connector housing 20 is secured with a ½"×½" square of standard 15,000 cycle nylon a Velcro® fastener 23. As a further alternative, fasteners other than hook-and-loop devices may be used (for example, clamps or tie wraps) but in any event it is preferred that the fastener used for tubing 17 be stronger than the fastener used for housing 20.

Another support or safeguard for tubing 17 includes a self-adhesive plastic "D" clip 27 placed above the cylindrical tube of a Velcro® fastener 26. An illustrative example of clip 27 is shown in FIGS. 12 and 14. Not only does clip 27 absorb stress, thus cushioning any stress the a Velcro® fastener might receive, clip 27 also, if the a Velcro® fastener somehow failed to stay together, keeps tubing 17 in place because the rounded portion of clip 27 restricts tubing 17 from moving away from the straight portion of clip 27.

Figure 10:
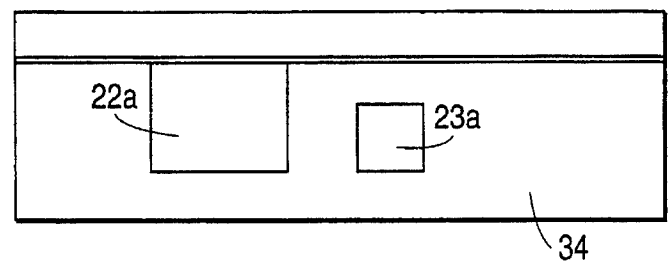
FIG. 10 shows where the hook side of the hook-and-loop device is to be placed on the tree stand.

Both types of a Velcro® fastener are mounted near the top edge of tree stand 34 with the bottom edges being at the same level, with connector housing a Velcro® fastener hook side 23*a* placed just to the side of tubing a Velcro® fastener hook side 22*a*, as shown in FIGS. 9 and 10. In this manner, the bottom of tube 17 should be flush with the bottom of connector housing 20. Tubing a Velcro® fastener loop side 22*b* and housing a Velcro® fastener loop side 23*b* are mounted onto tube 17 and housing 20, respectively.

Waterer 30 could be damaged during the setting up of the tree if it were permanently affixed to the tree stand. Therefore, a Velcro® fastener is used so the unit can be removed but still be secure when in use. A Velcro® fastener is easy to install and is equally secure in metal or plastic tree stands of various designs and sizes. Also, storing the unit in a cooler place than an attic, where many users keep their seasonal decorations, is desirable so that tubing 17 retains its flexible maneuverability and watertight properties and does not dry out, becoming stiff or brittle in the heat. Being able to remove waterer 30 from the tree stand allows users to store it in a closet or other storage area located in a cooler environment than an attic.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for monitoring a predetermined level of water in a container and for adding water to the container to maintain such level, the apparatus comprising:

a housing including a funnel;

an elongate tube having one end terminating at the funnel for receiving water from the funnel and an opposite end for discharging water into the container; and a circuit including a battery, a momentary on/release off switch, a sensor, a resistor, and a display panel, the display panel being mounted on the housing and having a first indicator for indicating that a power supply is operational and a second indicator for indicating whether a water level in the container has achieved the predetermined level;

wherein both the first indicator and second indicator operate simultaneously when the momentary on/release off switch is in the momentary on position.

2. The apparatus of claim 1, wherein the first indicator is an LED having a first luminosity, and the second indicator is an LED having a second luminosity greater than the first luminosity.

3. The apparatus of claim 2, wherein the first indicator is a green LED and the second indicator is a red LED.

4. The apparatus of claim 1, wherein the circuit includes a wire connecting the sensor to the display panel, the wire being enclosed in the tube.

5. The apparatus of claim 1, wherein the sensor includes a plurality of terminals for sensing a plurality of levels of the water.

6. The apparatus of claim 1, wherein the funnel has a lip, and wherein the display panel is mounted on the housing at a location higher than the lip of the funnel.

7. The apparatus of claim 1, wherein the second indicator includes an audible tone.

8. The apparatus of claim 1, wherein the sensor is mounted in a connector housing, and wherein one portion of a hook-and-loop fastening device is fixed to each of the tube and the connector housing for releasably attaching the tube and the connector housing to the container.

9. The apparatus of claim 8, wherein the hook-and-loop portion fixed to the tube is stronger than the hook-and-loop portion fixed to the connector housing.

10. The apparatus of claim 1, wherein the resistor is connected to the first indicator for decreasing an output of the first indicator in comparison with the output of the second indicator.

11. The apparatus of claim 1, wherein the second indicator includes a translucent portion of the housing.

12. The apparatus of claim 1, wherein the housing comprises a hollow-ball shaped member with a flat portion for mounting the display panel and a hole for receiving water.

13. The apparatus of claim 1, wherein the sensor is mounted in a connector housing, and wherein one portion of a hook-and-loop fastening device is fixed to each of the tube and the connector housing for releasably attaching the tube and the connector housing to the container at a position entirely below a top edge of the container.

14. The apparatus of claim 4, wherein the sensor is outside of the tube and remote from the opposite end of the tube.

15. The apparatus of claim 14, wherein a bottom of the sensor is at a level flush with a bottom of the opposite end of the tube.

16. An apparatus for monitoring a predetermined level of water in a container and for adding water to the container to maintain such level, the apparatus comprising:

a housing including a funnel;

an elongate tube having one end terminating at the funnel for receiving water from the funnel add an opposite end for discharging water into the container; and a circuit including a battery, a momentary on/release off switch, a sensor, a resistor, and a display panel, the display panel being mounted on the housing and having a first indicator for indicating that a power supply is operational and a second indicator for indicating whether a water level in the container has achieved the predetermined level;

wherein both the first indicator and second indicator operate when the momentary on/release off switch is in an on position; and wherein the circuit includes a third indicator for indicating whether the water level has achieved an intermediate level below the predetermined level.

17. The apparatus of claim 16, wherein the first indicator is an LED having a first luminosity, the second indicator is an LED having a second luminosity greater than the first luminosity, and the third indicator is an LED having a third luminosity substantially the same as the second luminosity.

18. The apparatus of claim 17, wherein the first indicator is a green LED, the second indicator is a red LED, and the third indicator is a yellow LED.

* * * * *